(12) United States Patent
Srikanth et al.

(10) Patent No.: US 8,881,180 B1
(45) Date of Patent: Nov. 4, 2014

(54) CROSS PLATFORM DISCOVERY AND COMMUNICATION OVER A LOCAL NETWORK

(75) Inventors: Bhanu Srikanth, Santa Clarita, CA (US); Nathan Epstein, San Gabriel, CA (US); Jeff Schulz, Sherman Oaks, CA (US)

(73) Assignee: Jargon Technologies LLC, Burbank, CA (US)

( * ) Notice: Subject to any disclaimer, the term of this patent is extended or adjusted under 35 U.S.C. 154(b) by 287 days.

(21) Appl. No.: 13/299,118

(22) Filed: Nov. 17, 2011

(51) Int. Cl.
*G06F 3/00* (2006.01)
*G06F 9/44* (2006.01)
*G06F 9/46* (2006.01)
*G06F 13/00* (2006.01)

(52) U.S. Cl.
USPC ........... 719/328; 713/313; 713/318; 713/319; 713/320

(58) Field of Classification Search
None
See application file for complete search history.

(56) References Cited

U.S. PATENT DOCUMENTS

| | | | |
|---|---|---|---|
| 2001/0024974 A1* | 9/2001 | Cohen | 463/42 |
| 2001/0044339 A1* | 11/2001 | Cordero et al. | 463/42 |
| 2008/0215669 A1* | 9/2008 | Gaddy et al. | 709/203 |
| 2009/0034535 A1* | 2/2009 | Yokoyama | 370/395.54 |
| 2010/0214600 A1* | 8/2010 | Yagi | 358/1.15 |
| 2012/0023330 A1* | 1/2012 | Fink et al. | 713/161 |

OTHER PUBLICATIONS

Pass Static Byte Array in Parameter in Delphi, Oct. 12, 2010, StackOverflow.com.*
Stuart Cheshire et al., DNS-Based Service Discovery, draft-cheshire-dnsext-dns-sd-05.txt, Category: Informational, Sep. 10, 2008, 40 pages.
Stuart Cheshire et al., Multicast DNS, draft-cheshire-dnsext-multicastdns-04.txt, Category: Standards Track, Feb. 14, 2004, 43 pages.
PokerFun.tv, How to Play, MOVL, http://www.pokerfun.tv/howPlay.html, downloaded Nov. 16, 2011, 1 page.
WeDraw.tv, How to Play, MOVL, http://www.wedraw.tv__how__to__play.html, downloaded Nov. 16, 2011, 1 page.
MOVL Connect Platform, http://docs.connect.movl.com, downloaded Nov. 16, 2011, 16 pages.

* cited by examiner

*Primary Examiner* — H S Sough
*Assistant Examiner* — Craig Dorais
(74) *Attorney, Agent, or Firm* — Blakely, Sokoloff, Taylor & Zafman LLP

(57) ABSTRACT

Exemplary methods, apparatuses, and systems that execute a cross-platform application programming interface (API) that supports a plurality of applications are described. The cross-platform API implements a request from an application for a device to participate in a unique conversation, the unique conversation being identified by a topic and independent of a unique identifier for entities. The cross-platform API further provides the application an abstracted discovery mechanism by which the application causes the device to discover an entity that is accessible on the local network participating in the unique conversation. The cross-platform API further provides the application with a message passing mechanism by which the application causes the first device to exchange messages related to the unique conversation with the entity.

17 Claims, 7 Drawing Sheets

```
                    ← 500

String topic = "wake up call";     ← 505 class AlarmMessage extends message     ← 510
{
  int hour;
  int minute;
  int ampm;
  AlarmMessage() {
    super();
    setID( 333 );
  }
  protected void write() throws IndexOutOfBoundsException {
    writeINT( hour );
    writeINT( minute );
    writeINT( ampm );
  }
  protected void read() throws IndexOutOfBoundsException {
    hour = readINT();
    minute = readINT();
    ampm = readINT();
  }
}

Chatter chatter = new Chatter( this );     ← 515
chatter.open();

Conversation conversation = Talk.discuss( chatter,topic );     ← 520 void onWakeUpTime() {     ← 525
  message.hour = getHour();
  message.minute = getMinute();
  message.ampm = getAMPM();
  byte [] data = message.pack();
  chatter.ingest( address,port,data,data.length );
} public digest( byte [] data,int length ) {     ← 530
  if ( Message.peek( data ) == 333 ) {
    message.unpack( data );
    buzzAlarm( message.hour,message.minute,message.ampm );'
  }
}
```

FIG. 5

CROSS PLATFORM DISCOVERY AND COMMUNICATION OVER A LOCAL NETWORK

FIELD OF THE DISCLOSURE

This disclosure relates generally to the field of consumer electronic devices and, in particular, to a cross-platform framework for supporting a plurality of applications in the discovery and participation in unique conversations over a local network.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2011, Jargon Technologies LLC, All Rights Reserved.

BACKGROUND OF THE DISCLOSURE

A plurality of devices and software services are often connected to or reachable within a local network. In order for the plurality of devices to interact, these devices and services need a way to discover each other and communicate with each other. For example, multiple devices exchange particular messages with each other to facilitate a multi-player game, control of one device by another device, content sharing between devices, performance of printing services, etc.

Protocols such as multicast Domain Name System (mDNS) and Universal Plug and Play (UPnP) allow devices on a local network to discover one another and communicate in a limited fashion. DNS-based service discovery (DNS-SD) is used in conjunction with mDNS to discover services. In accordance with DNS-SD, devices use DNS messages to advertise service instance names. A device offering services publishes details of available services: instance, service type, domain name, and optional configuration parameters. A client device stores a service name in a persistent way to access the service, and perform a DNS query for the host name and port number when it's time to connect. While mDNS is focused on discovery, mDNS also provides a notification function for passing a small amount of information between devices. Significant effort on the part of the developers, however, is needed to develop an application that utilizes the discovery and messaging provided by mDNS. Moreover, mDNS is focused on finding a uniquely named instance of a service, which can be cumbersome and limiting for programmers. Service-based communication is limited because a service must be strictly defined to enable a specific function. For example, communication with a print service must convey data in a specific way the corresponding service understands in order to achieve the intended result of printing a document. Also, mDNS includes restrictions associated with the messaging, such as length of the message etc.

Similarly, Simple Service Discovery Protocol (SSDP) is used in conjunction with UPnP for service discovery. In accordance with SSDP, devices use Hypertext Transfer Protocol (HTTP) notification announcements that contain Uniform Resource Identifier (URI) service-types and Unique Service Names (USN). A first device retrieves a description of a service offered by a second device. The UPnP description for a device includes vendor-specific, manufacturer information and, for each service, the description includes a list of the commands, or actions, to which the service responds, and parameters, or arguments, for each action. The first device can send actions to the second device's service by sending a suitable control message to the control Uniform Resource Locator (URL) for the service. Developers, however, still need to develop software to enable the described discovery and communication. Much like mDNS, UPnP/SSDP is developed around the concept of finding uniquely named instances of an entity and has some limitations on the size of the message.

Standards/protocols such as mDNS/DNS-SD and UPnP/SSDP facilitate the discovery of services within the IP network. The approach that mDNS and UPnP take to enable discovery and messaging is centered around the concept of finding a uniquely named instances of an entity/service. This can be burdensome to creative producers and developers of interactive application who are focused on creating unique user experiences. Additionally, for such a standardized solution, a discovered service is either useful or not (to a client) depending on whether it supports a given communications protocol and capabilities. For example, suppose a client has discovered an LPR 'printer' service by way of mDNS/DNS-SD. The service conveys, via a DNS-TXT record, that it supports PostScript data. The client, having discovered the service, may now engage the service to print an image.

For example, suppose a client has discovered a "Printer:1" device by way of UPnP/SSDP. This device supports the required service "PrintBasic:1." The Extensible Markup Language (XML) Service Description offered by the device for the "PrintBasic:1" service indicates that it can print a .png format image. The client, having discovered the service, may now engage the service to print an image. These standardized solutions do not fulfill a need for arbitrary communications between a discovered service and a client.

Efforts to standardize a single protocol have not succeeded, leaving both mDNS and UPnP in continued, predominant use. As a result, a developer of an application or device often chooses one or the other protocol. Choosing one protocol limits that application or device to discovering and communicating only with other applications or devices that use the same protocol. Once a developer has chosen a protocol, the developer delves into the chosen protocol and creates the necessary software to enable discovery of other devices and communication between devices. If the developer chooses to work with both protocols, the effort to create software to enable discovery and communication with each of the protocols is even more labor-intensive and complex.

Other existing technologies enable arbitrary communication between devices but such technologies are facilitated by transmission of data to back-end servers over the internet which then forwards them to other devices as needed. This communication is neither efficient nor cost-effective as messages may travel the globe before being transmitted to a device six feet away. Furthermore, some devices on the local network, such as printers, may not have internet access.

BRIEF DESCRIPTION OF THE DRAWINGS

The present invention is illustrated by way of example and not limitation in the figures of the accompanying drawings.

FIG. 5 is an example of pseudo-code of an application that utilizes the cross-platform framework to participate in a unique conversation over a local network;

DETAILED DESCRIPTION

Figure 1:
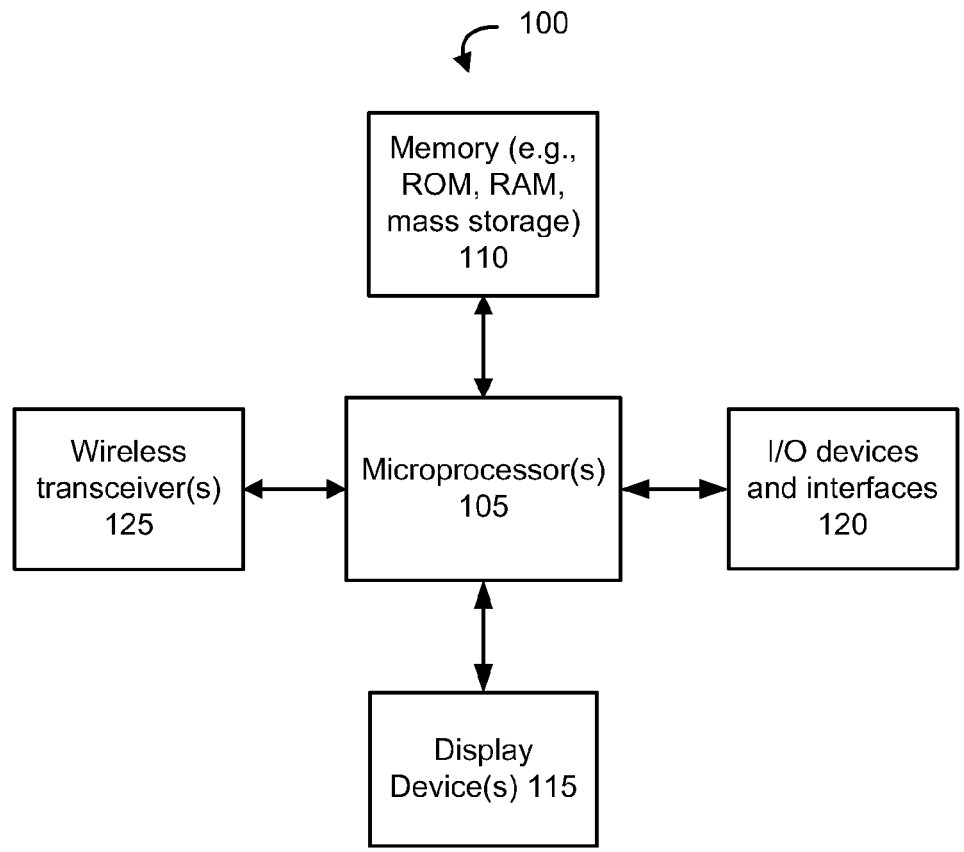
FIG. 1 illustrates, in block diagram form, an exemplary processing system that can execute a cross-platform framework for supporting a plurality of applications in the discovery and participation in unique conversations over a local network.

Various embodiments and aspects of the invention will be described with reference to details discussed below, and the accompanying drawings will illustrate the various embodiments. The following description and drawings are illustrative of embodiments of the invention and are not to be construed as limiting the invention. Numerous specific details are described to provide a thorough understanding of various embodiments of the present invention. For example, numerous specific details such as logic implementations, software module allocation, and details of operation are set forth in order to provide a more thorough understanding of embodiments of the present invention. It will be appreciated, however, by one skilled in the art that embodiments of the present invention may be practiced without such specific details. In certain instances, well-known or conventional details are not described in order to provide a concise discussion of embodiments of the present inventions. Full software instruction sequences for some examples have not been shown in detail in order to not obscure the embodiments of the present invention. Those of ordinary skill in the art, however, with the included descriptions, will be able to implement appropriate functionality without undue experimentation.

While the terms "couple" and the like are used, it would be understood to one of ordinary skill in the art that any of the above components could be software routines and that coupling means the routing of variables, the instantiation of routines, etc.

Embodiments of the invention enable richer means of communication between entities, not strictly services. As used herein, the term "entities" refers to devices, applications, services, and other similar things being discovered over a local network and treated as participants in a conversation. The existing protocols described above enable discovery, but do not offer rich communication between entities, as may be needed for more interactive applications. For example, the communication offered by services is limited to "print this," "play this video," "transfer this image," etc. Embodiments of the invention overcome the limitation of existing protocols by adding the capability of handling commands to perform arbitrary actions on a device. Embodiments of the invention include discovery in as much as it exposes entities with certain names that are reachable in the local network. For this purpose, embodiments of the invention may utilize the above-described protocols to facilitate discovery. Embodiments of the invention, however, do not implement a device/service or interact with DNS. Embodiments of the invention enable communication, including sending and receiving of packets for the transfer of data. The interpretation of the data is left to the specific application, enabling custom interactions between discovered entities.

Additionally, embodiments of the invention relieve developers from needing to focus on the intricate details of discovery and communication by handling these details in an application programming interface (API) or set of API, thereby allowing the developers to focus on user-experience and building highly interactive applications. Embodiments of the invention may utilize mDNS or UPnP or other means to achieve the discovery and messaging and, therefore, do not preclude reaching actual services provided by mDNS and UPnP.

FIG. 1 illustrates, in block diagram form, an exemplary data processing system 100 that can execute a cross-platform framework for supporting a plurality of applications in the discovery and participation in unique conversations over a local network as described herein. As used herein, a conversation generally refers to a collection of participant entities exchanging messages related to a unique topic. There can exist, at any one time within a local network, a single conversation on a given topic. Multiple concurrent conversations can exist, but only one per topic. A conversation has one or more participants, who interact with one another in the conversation. The lifetime of a conversation is the time in which there remains at least one participant.

Data processing system 100 may include one or more microprocessors 105 and connected system components (e.g., multiple connected chips) or the data processing system 100 may be a system on a chip.

The data processing system 100 includes memory 110 which is coupled to the microprocessor(s) 105. The memory 110 may be used for storing data, metadata, and programs for execution by the microprocessor(s) 105. The memory 110 may include one or more of volatile and non-volatile memories, such as Random Access Memory (RAM), Read Only Memory (ROM), Flash, Solid-State Drive (SSD), Phase Change Memory (PCM), or other types of data storage.

For one embodiment, the data processing system 100 includes a display device 115. Display device 115 provides a visual user interface for the user. This user interface may include a graphical user interface which, for example, is similar to that shown on a computer, cellular phone, or other consumer electronics device running operating system software. For one embodiment, the display device 115 is a separate device coupled to the data processing system 100 (e.g., a television or monitor coupled to and enabled to display output from a consumer electronics device).

For one embodiment, the data processing system 100 includes one or more input or output ("I/O") devices and interfaces 120. I/O devices and interfaces 120 are provided to allow a user to provide input to or receive output from the data processing system 100. Exemplary I/O devices include a touch panel or a multi-touch input panel, sensor, camera, keyboard, keypad, buttons, receiver for a remote control, microphone, speaker, interface for microphones or speakers, and other known devices to receive input or provide output.

The system 100 also includes one or more wireless transceivers 125. For example, the data processing system 100 may include an IEEE 802.11 transceiver, an infrared transceiver, a Bluetooth transceiver, a wireless cellular telephony transceiver, or a transceiver that operates according to another wireless protocol to connect the data processing system 100 with another device, external component, or a network.

It will be appreciated that one or more buses, may be used to interconnect the various components shown in FIG. 1.

The data processing system 100 may be a consumer electronics device such as a disk-based media player (e.g., a Blu-ray™ player, gaming console, etc.), set-top box (e.g., Tru2way®, Advanced Digital Broadcast, etc.), home control device (e.g., controller for lighting, heating or air conditioning, security system, etc.), an appliance (e.g., mobile/cellular telephone, Wi-Fi based telephone, personal digital assistant, handheld computer which includes a cellular telephone, media player or entertainment system, printer, television, tablet-style device, digital picture frame, etc.), personal computer, or devices which combine aspects or functions of these devices, such as a media player combined with a PDA and a cellular telephone in one device. In other embodiments, the data processing system 100 may be a network computer or an embedded processing device within another device or consumer electronic product.

It will be appreciated that additional components, not shown, may also be part of the data processing system 100, and, in certain embodiments, fewer components than that shown in FIG. 1 may also be used in a data processing system 100. For example, in one embodiment, the data processing system 100 includes a wired communication interface, such as an Ethernet interface. Similar to the wireless transceiver(s) 125, a wired communication interface enables the data processing system 100 to communicate with another device over a local network/connection.

It will be apparent from this description that aspects of the inventions may be embodied, at least in part, in software. That is, the computer-implemented methods may be carried out in a computer system or other data processing system in response to its processor or processing system executing sequences of instructions contained in a memory, such as memory 110 or other machine-readable storage medium. Such machine-readable storage media may include, without limitation, tangible arrangements of particles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions. In various embodiments, hardwired circuitry may be used in combination with the software instructions to implement the present embodiments. Thus, the techniques are not limited to any specific combination of hardware circuitry and software, or to any particular source for the instructions executed by the data processing system 100.

Figure 2:
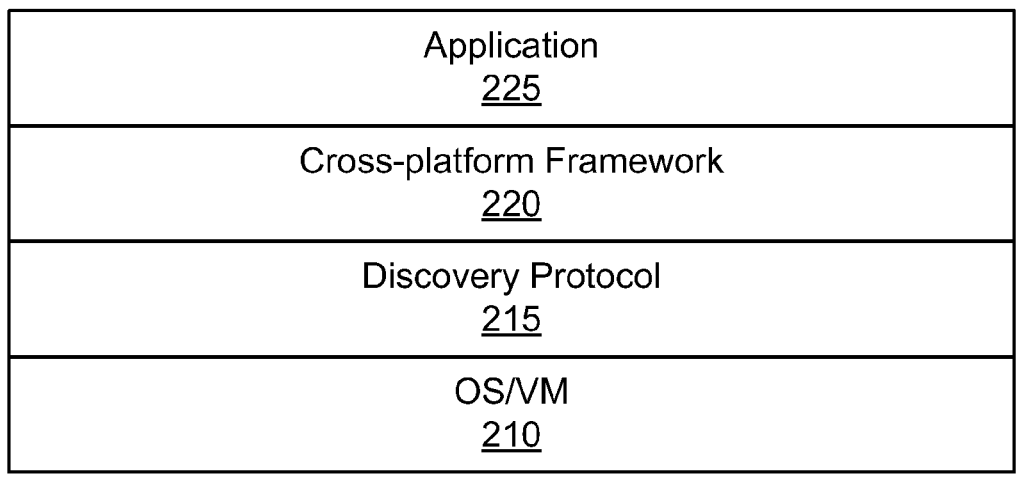
FIG. 2 illustrates an exemplary software stack utilizing device-level abstraction that can execute a cross-platform framework for supporting a plurality of applications in the discovery and participation in unique conversations over a local network.

FIG. 2 illustrates an exemplary software stack 200 that can execute a cross-platform framework for supporting a plurality of applications in the discovery and participation in unique conversations over a local network as described herein. This software stack 200 includes an operating system or virtual machine (OS/VM) layer 210. The OS/VM layer 210 is common to consumer electronics devices. The OS/VM layer 210 manages underlying hardware of the device 100 and provides common services for application software.

On top of the OS/VM layer 210 is discovery protocol layer 215. The discovery protocol layer 215 automatically creates a usable local (e.g., Internet Protocol (IP)) network without manual operator intervention or special configuration servers, allowing devices to connect to a network automatically. For one embodiment, the discovery protocol layer 215 implements mDNS/DNS-SD. Alternatively, the discovery protocol layer 215 implements UPnP/SSDP or another discovery protocol. For yet another embodiment, the discovery protocol layer 215 implements a combination of two or more of mDNS/DNS-SD, UPnP/SSDP, and other discovery protocols.

On top of the discovery protocol layer 215 is the cross-platform framework layer 220. The cross-platform framework layer 220 is an application programming interface (API) or set of API that provide a level of abstraction between the application layer 225 and the discovery protocol layer 215. The cross-platform framework layer 220 does not impose a relationship between participants. For example, the cross-platform framework layer 220 provides a means of communication in the form of a messaging API, as described below, but the application layer 225 is not restricted to the particular messaging system provided. The cross-platform framework layer 220 supports both peer-to-peer and client-server communication relationships between the participants.

As described above, the discovery protocol layer 215 is able to discover unique services available within a local network. The cross-platform framework 220, however, does not expose a participant in a conversation as a useful service to any discovery protocol-aware entities within the local network (e.g., to-stored via DNS record-keeping software) as would be expected in typical use of the discovery protocols. Instead, the cross-platform framework 220 utilizes the discovery protocol layer 215 to discover non-unique instances of participants participating in a conversation within the local network.

Providing a level of abstraction between the application layer 225 and the discovery protocol layer 215 removes at least some of the complexity of developing the application 225 and increases the portability of the application 225 between platforms. The cross-platform framework 220 provides a single interface for applications to implement discovery and communication through the discovery protocol layer 215. The application 225, and therefore a developer of an application 225, need not be concerned with whether the discovery protocol 215 utilizes mDNS/DNS-SD, UPnP/SSDP, and/or another discovery protocol. By utilizing the cross platform framework 220, the application 225 is able to utilize the same classes, functions, etc. in performing discovery and exchanging of messages for each of mDNS/DNS-SD, UPnP/SSDP, or another discovery protocol. Additionally, the libraries, functionality, etc. of the cross-platform framework 220 are extensible. As additional discovery protocols are defined, the cross-platform framework 220 may be extended to provide an interface to the additional discovery protocols while maintaining compatibility with existing applications 225.

For example, an application developer who has experience developing applications for a device/platform that utilizes mDNS/DNS-SD may want to port the application over to, or write a similar application for, a device/platform that utilizes UPnP/SSDP or another discovery protocol. If developer only has experience with mDNS/DNS-SD, the developer would not need to learn the intricacies of UPnP/SSDP or the other discovery protocol. A developer that is able to utilize the cross-platform framework 220 may instead focus on utilizing the same discovery and message exchange functionality of the cross-platform framework 220 without needing to understand the implementation details that are specific to different discovery protocols 215. The developer, therefore, does not have to acquire expertise in various discovery protocols 215, and can concentrate on different aspects of a specific application 225. Additionally, the cross-platform 220 supports various applications. Application developers can, therefore, develop applications with a single, consistent interface in mind. Given the complexity of discovery and message passing, including memory use, read/write packetizing, etc., utilizing the described application layer framework 220 provides an enormous advantage in ease of development and portability.

For one embodiment, the cross-platform framework 220 supports communication within a link-local (locally unique address) network, such as a business intranet or home WiFi network. This does not preclude a larger domain, such as the Internet. The description of cross-platform framework 220 set forth herein, however, is generally concerned with operating within an environment that is bounded by the locally connected network.

In one embodiment, the cross-platform framework 220 determines which discovery protocol 215 to utilize by attempting to use one (e.g., mDNS) and, if it fails, tries another (e.g., UPnP or other protocol), etc. Alternatively, the cross-platform framework 220 uses multiple protocols at once. For example, the cross-platform framework 220 may send a mDNS request and a UPnP message and listen for responses to discover, respectively mDNS and UPnP capable entities.

Once the discovery protocol 215 is determined, the cross-platform framework 220 implements requests according to said protocol. For example, for DNS-SD, a device 100 that wants to participate in a conversation on the unique topic "coloring book" would be utilize an exemplary application protocol of "Jargon" and an instance name based upon the topic, resulting in a Service-Instance-Name such as "coloring book._jargon._tcp.local." Similarly, for SSDP, a device 100 that wants to participate in a conversation on the unique topic "coloring book" would utilize an exemplary service-type of "urn:schemas-upnp-org:service:Jargon:1" with a domain name based upon the topic, resulting in a service type such as "urn: coloring book:service:Jargon:1."

While the cross-platform framework 220 does not expose a participant in a conversation as a useful service, it does not preclude the usage of actual services. For one embodiment, the cross-platform framework 220 provides access to actual services via proxy-participants. In one embodiment, proxy-participants use a specific means of communication, in contrast to participants, as described in above. For example, a proxy-participant representing a UPnP capable printer may only understand communication as specified by UPnP PrintBasic:1 format. In one embodiment, the communicating protocol between attendees is determined when attendees are, in fact, actual services.

A proxy-participant will attend a conversation on a topic on behalf of one or more actual services to which the proxy-participant has access. For example, suppose a participant wants to find any printers within the local network that can print plain text. If a proxy-participant for printer services, e.g., with access to printers advertising the DNS-SD Application Protocol "_printer" and/or access to printers advertising the SSDP "PrintBasic," the proxy-participant can attend a conversation on the topic "printers" (or other topic) and be acknowledged by non-proxy participants.

The proxy-participant is responsible for defining messages or other mechanisms by which it exposes an underlying service. For one embodiment, the cross-platform framework 220 contains a proxy-participant for the topic "printers" that provides access to IP printers. This proxy-participant defines the message extensions for information messages, status messages, and job messages. The contracts for the extensions define how to interact with the proxy-participant to send an image to be printed. For example, a proxy-participant information message can be used to convey information about a printer's capabilities, such as what kind of paper is supported, if the printer supports color and/or black & white printing, etc. An exemplary proxy-participant job message can be used to send a job to a printer, specifying settings such as quality, document format, etc., as well as providing a URL to the source document to be printed. An exemplary proxy-participant status message can be used to convey status of a printer, indicating if a job has completed, failed, etc., and if there is an error such as the printer being out of paper, a paper jam, etc.

For one embodiment, the application 225 is a multi-player game, remote control application, content sharing application, polling application, or printing application. For an alternate embodiment, the application 225 is a home control application, a personal data manager or viewer, saves or plays back media, provides a search or organization capability within a saved library of media, is a content delivery application, is an educational application, etc.

The following figures will illustrate examples of the use of the application layer 225 and its interaction with the cross-platform framework 220, including exemplary flow charts, block diagrams, and pseudo-code. While examples of the software layers are described in a Java environment, similar layers may be used in other software environments.

Figure 3:
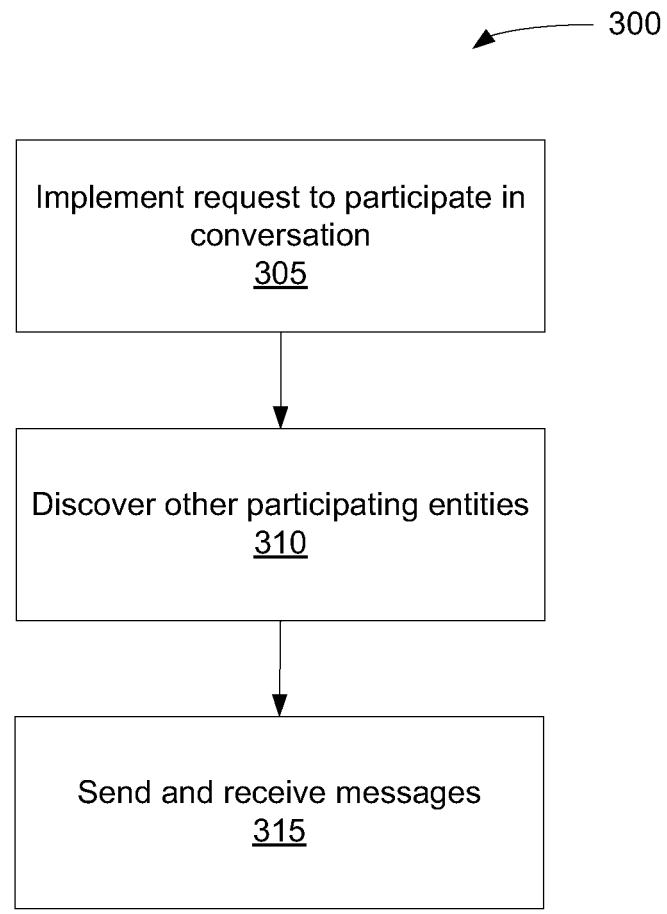
FIG. 3 is a flow chart that illustrates an exemplary method performed by the cross-platform framework in creating or joining a conversation, discovering other entities, and exchanging messages over a local network.

FIG. 3 is a flow chart that illustrates an exemplary method 300 within the cross-platform framework 220 of creating or joining a conversation, discovering other participating entities, and exchanging messages. At block 305, a device 100 utilizes an application layer 225 to issue a request to participate in a conversation about a particular topic and a cross-platform framework 220 to implement the request. A topic is uniquely identified by name. For one embodiment, the topic is a descriptive of the intent of the conversation. For example, the topic "flying donut attack v1.1 00003" might be used for a conversation containing participants playing the "flying donut attack" game against each other. Similarly, a topic name such as "printers" might infer a conversation in which one or more of the participants are proxies to an IP service that supports printing. For one embodiment, a topic name is in a character encoding format that is compliant with a particular standard, e.g., a UTF-8 encoded string of 1-63 octets in length.

For one embodiment, to help avoid topic name conflict, topic names follow a package-naming convention. For example, if a company "Bad Water Corporation" uses the cross-platform framework 220 and the topic can be described as "Filtration Monitor," the choice for the topic could be "com.badwater.talk.Filtration Monitor V1."

A participant in a conversation is uniquely identifiable by a local network address, such as an IP address, and a port number. An application 225 implements an interface to identify itself/the underlying device 100 as a participant that can converse on a given topic. To be uniquely identifiable and reachable among all the participants in a conversation, the participant interface provides the local address and port number to the conversation. In using both an IP address and a port number, multiple participants may have the same IP address as long as they have different port numbers. The local address may have been acquired via Dynamic Host Configuration Protocol (DHCP), administrator intervention, multicast- DNS, or some other process. For one embodiment, the cross-platform framework 220 assumes that the uniqueness of the participant's local network address has been established, e.g., without requiring that the local network address be obtained from a particular source.

For one embodiment, a device 100 joins or creates a conversation utilizing a factory method within the cross-platform framework 220. A factory method is an object-oriented design pattern to create objects without specifying the exact class of object that will be created. Instead, a factory method lets a class defer instantiation to subclasses. For one embodiment, the factory method utilized within the cross-platform framework 220 receives the identification of the device 100 as a participant (e.g., local address and port number) and a topic name and returns a conversation (e.g., a reference to a conversation object, such as a specific subclass). When a device 100 becomes a participant of a conversation, the device 100 notifies other participants in the same conversation of its presence by advertising the device's local address and port number as being associated with the conversation.

At block 310, the device 100 discovers other entities participating in a unique conversation. The device 100 utilizes the cross-platform framework 220 to take attendance of any other participants in a conversation for the topic. For one embodiment, any participants (including the given participant) discovered are reported as present via an acknowledge callback method. For example, the cross-platform framework 220 transmits a broadcast message for attendance in a conversation. Entities respond to the broadcast message indicating a conversation topic in which they are or want to be a participant (this may also be sent as a broadcast or multicast). One or more entities receive the responses and use them to track current participants in one or more conversations. For one embodiment, the cross-platform framework 220 maintains a collection of addresses and/or ports corresponding to participants.

In one embodiment, when attendance is called, the cross-platform framework 220 purges contents of such a collection and sends out the broadcast described above. Any responses are added to the collection. The collection reflects participants currently participating in the conversation.

Additionally, a participant that ends its participation in the conversation may call an acknowledge method signaling that the participant is now absent. For one embodiment, the cross-platform framework 220 maintains a list to keep track of current participants of each unique conversation in which it is participating. For one embodiment, the cross-platform framework 220 asynchronously checks attendance within the conversation. For example, after noticing an absence of messages from a particular participant, an application 225 could utilize the cross-platform framework 220 to retake attendance, establishing a more up-to-date list of attendees.

At block 315, the device 100 sends and receives messages to one or more participants within the unique conversation. The cross-platform framework 220 contains a message class for the purpose of providing re-usable packet packaging for applications 225. For one embodiment, the message class provides methods for reading from and writing to a contiguous byte array that may be sent as a packet on the physical network. For one embodiment, the message class allocates a static byte array upon initialization, thereby reducing allocation and garbage collection overhead. For one embodiment, each message also automatically passes an integer ID value in each packet sent on its behalf to identify the message type.

For one embodiment, the message class is a base-type for data that is sent in regard to a conversation which may be extended by an application 225. An application 225 extends the message class to create application-specific messages. The message class provides read and write packetizing (e.g., of Java™ scalar values) such that the message data can be transmitted over the local network. An application 225, therefore, only needs to define a message by its primitive class-fields. The application 225 does not have to consider the mechanics of sending TCP/IP packets along the local network. These mechanics are handled by the cross-platform framework 220.

For example, the cross-platform framework 220 (e.g., by way of a Message class) provides mechanisms for converting data types into bytes. The byte array created by this process represents the "packed" message. The cross-platform framework 220 also provides a write method to be implemented by application-specific subclasses. The write method calls the methods described above for converting the message data into bytes. The application 225 calls the message write method to "pack" the data into bytes for transmission. Similarly, the cross-platform framework 220 provides a read method to be implemented by application-specific subclasses. The read method calls corresponding methods to convert individual bytes into message data. Thus, when an application 225 receives a message, it calls the message unpack method, which in turn calls the individual message methods performing the conversion from bytes into meaningful data. For example, a message may be used to send a text string. The message write method may be implemented by an application developer to convert each character in the text string into a byte using ASCII text encoding. Similarly, the message read method may be implemented to convert an array of bytes into a string of characters using ASCII text encoding.

For one embodiment, packet-level authentication is not provided by the cross-platform framework 220. An application may introduce any secure communication protocol, encryption, token exchange, or any other mechanism appropriate for its function, however, in using the cross-platform framework 220.

An exemplary conversation utilizing the method 300 includes enabling a mouse interface on a device, such as a television, which traditionally does not have such interface. A hand-held device, e.g., a smartphone or tablet including a touchscreen interface, can be used as track pad as a mouse interface for another device, e.g., a connected television, regardless of whether or not the television includes its own a mouse interface. In this case, the hand-held device and the television are engaged in a conversation wherein the hand-held device conveys coordinate information based upon touchscreen input on the handheld device for an onscreen mouse-pointer displayed on the television.

Figure 4:
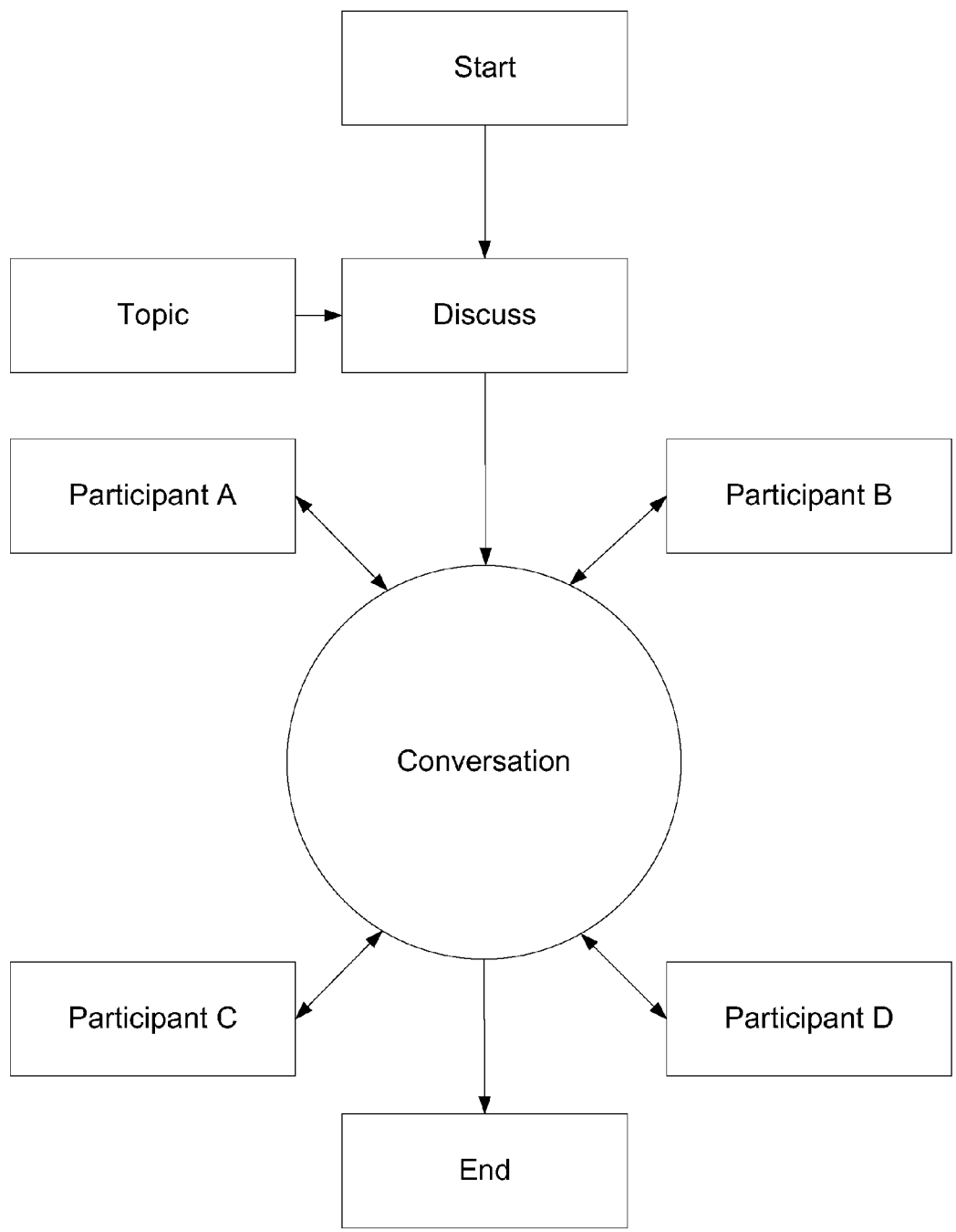
FIG. 4 illustrates, in block diagram form, an exemplary conversation facilitated by the cross-platform framework over a local network.

FIG. 4 illustrates, in block diagram form, an exemplary conversation facilitated by the cross-platform framework. A conversation starts with an application 225 being executed by a first participant, e.g., Participant A, sending a request to the cross-platform framework 220 to discuss a unique topic. The cross-platform framework 220 utilizes a factory method as a mechanism by which a conversation either begins or adds attendance. The discuss factory method yields a reference to a conversation, which will asynchronously notify the participant of changes in attendance until the conversation is told to end for the participant.

The cross-platform framework 220 utilizes an attendance method, which is the mechanism by which the list of participants in a conversation is maintained. The attendance method will asynchronously invoke a probing of the local network space to find entities that are participating in this conversation. For example, Participant A may take attendance of the Conversation and determine that Participants B, C, and D have joined the Conversation. For one embodiment, an acknowledge method is called, where the parameters (e.g., an IPV4 or IPV6 address and integer port number) uniquely identify the participating entity.

During the conversation, participants can send and receive messages using the cross-platform framework 220 (e.g., broadcast messages to all participants or messages sent between two or more particular participants). As a specific example, Participants A-D may be a television, cell phone, security system, and a camera that have started and are participating in a conversation on the topic of "intrusion." If the security system detects a breach (e.g., a burglar), it can send a message to the cell phone. A corresponding application on the cell phone reacts to the message, e.g., by calling or sending a message for emergency assistance. The security system also sends a message to the camera, alerting the camera to the location of the breach. A corresponding application for the camera focuses the camera on the location of the breach and sends a corresponding video feed to a particular channel for the television. The camera or the security system sends a message to the television to switch to the channel for the camera video feed. A developer (e.g., for the security system company), can focus on writing applications 225 for each participant and their roles in the intrusion conversation without being concerned how the participants discover one another or the mechanics of how they send/receive messages.

A participant can end its involvement in a conversation. For one embodiment, in ending participation, the participant notifies the other participants that it is now absent. If the participant ending its involvement is the only remaining participant in the conversation, the conversation ends.

FIG. 5 is an example of pseudo-code of a wake up call application 500 that utilizes the cross-platform framework 220 to participate in a conversation. The application 500 indentifies a unique topic 505, "wake up call." The application 500 extends the cross-platform framework 220 message class with an AlarmMessage class 510. The AlarmMessage class 510 defines parameters for the time of the wake up call and how the time is written and read. The application 500 establishes message passing by utilizing a chatter method 515. The chatter method asynchronously starts a communication layer that is capable of sending and receiving messages. For one embodiment, an application 225/500 utilizing a chatter method can send messages to any or all participants in a conversation, but the application need not maintain its own collection of participants. The details of how to address/deliver a message to a participant are handled by the chatter class and attendance method implemented by the cross-platform framework 220.

For one embodiment, the chatter type implements the participant interface. Therefore, the application 500 can participate in a conversation by passing 520 a chatter instance as the participant parameter to the discuss factory method (which was described above with reference to FIG. 4). A wake up time is set by defining 525 the time for the wake up call, packetizing the time and sending the wake up time as a message to a participant identified by address and port. A message identifier is automatically included in the message. The wake up time message is received 530 by peeking at the message identifier for a predetermined message type and unpacking the message if the predetermined message type is identified. The alarm method can then be called using the wake up time. For example, the wake up call application may be implemented by a hotel front desk and guest.

Figure 6:
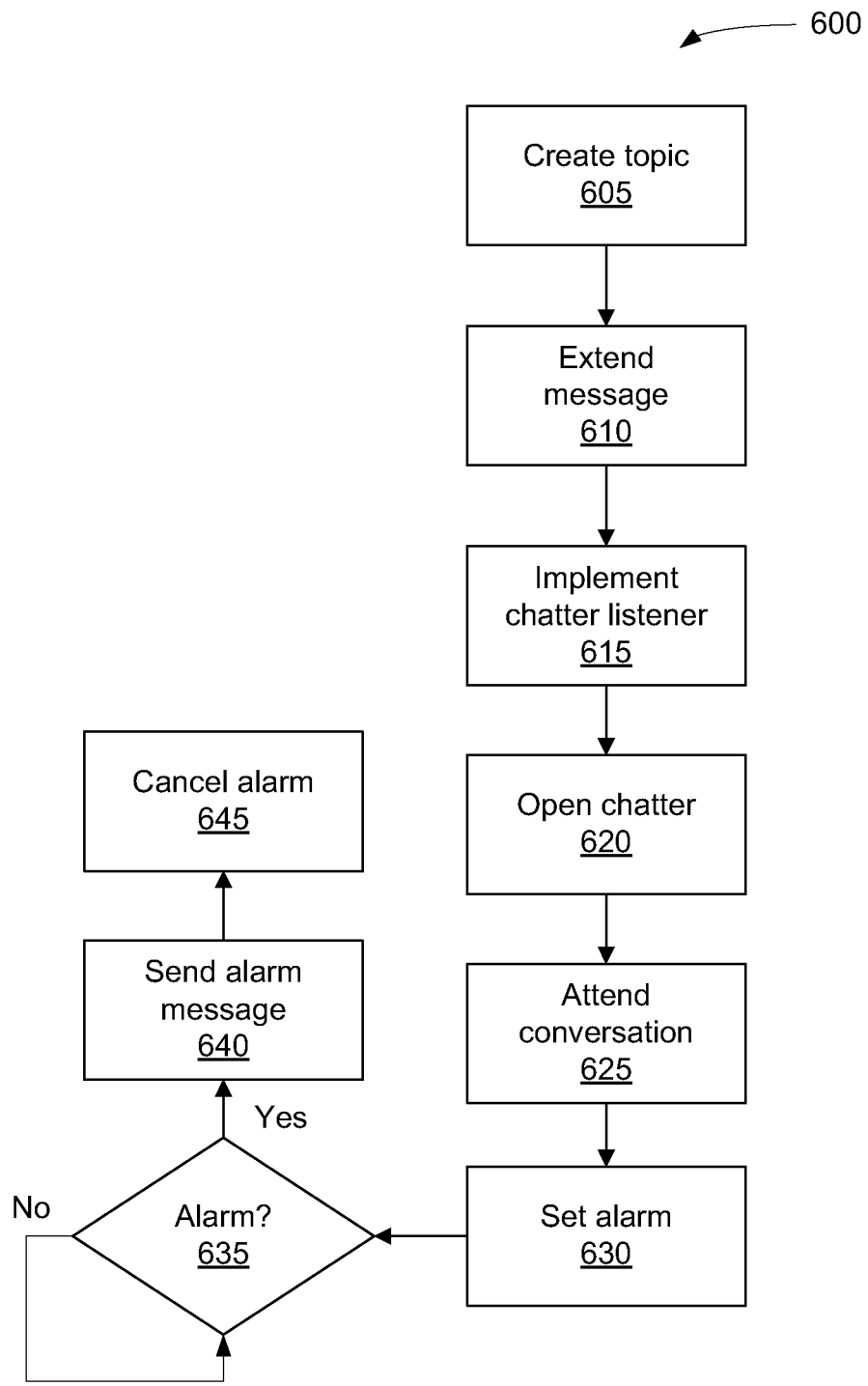
FIG. 6 is a flow chart that illustrates a first participant's exemplary role in the conversation described with reference to FIG. 5.

FIG. 6 is a flow chart that illustrates a method 600 performed by a first participant role in the conversation described with reference to FIG. 5. Continuing with the example above, the first participant is the hotel front desk utilizing device 100 and an application 500 and corresponding cross-platform framework 220 (front desk). At block 605, the front desk creates the topic 505. At block 610, the front desk extends the message class 510. At block 615, the front desk implements a chatter listener. The chatter listener interface checks for messages sent within the local network and receives messages sent by other participants in the conversation, including attendance notifications for participants in the conversation. The cross-platform framework 220 shields the application 500 from protocol-specific details, allowing the application 500 to focus on the data that is sent or received. At block 620, the front desk calls the chatter method 515 to start a communication layer that is capable of sending and receiving messages. Messages can be sent and received according to any defined underlying protocol (e.g., mDNS/DNS-SD, UPnP/SSDP, etc.). At block 625, the front desk joins 520 the wake up call conversation. At block 630, the front desk sets an alarm by defining a wake up time 525. At block 635, the front desk waits until the wake up time, e.g., by continually determining if the current time is the wake up time. At block 640, when the wake up time occurs, the front desk sends an alarm message to the hotel guest. At block 645, the front desk cancels the alarm.

Figure 7:
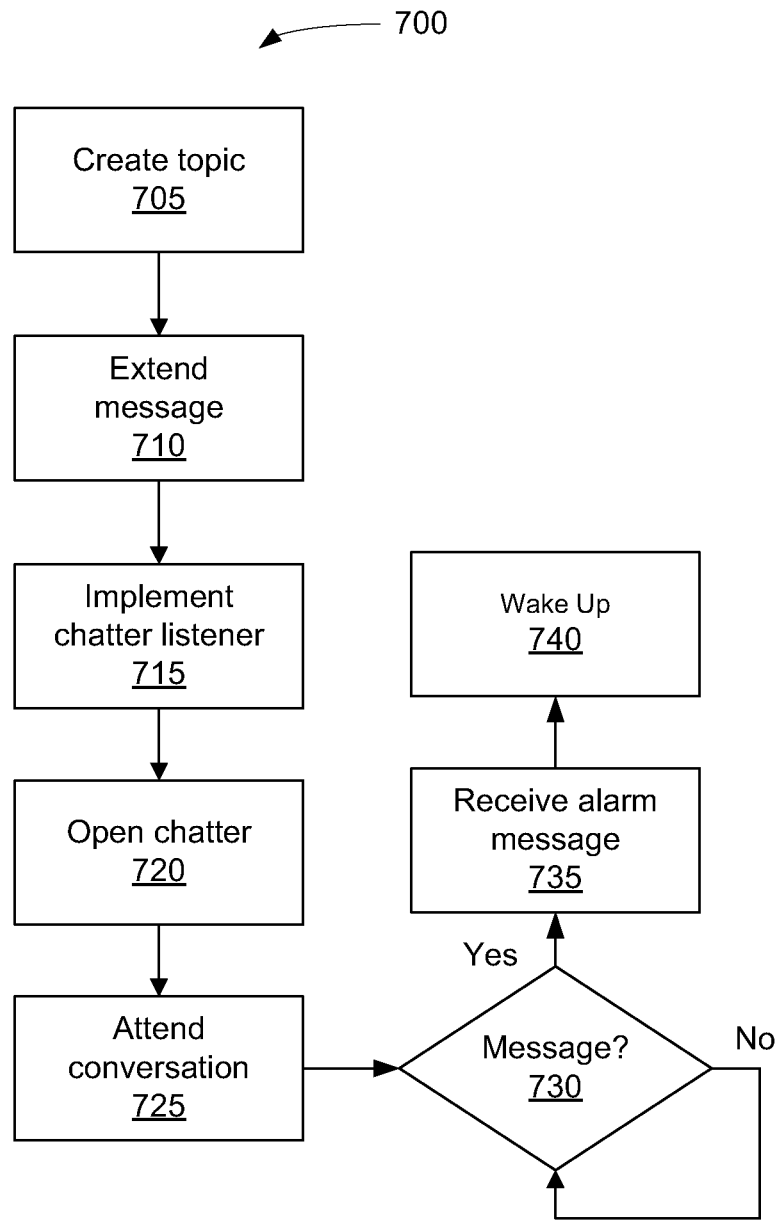
FIG. 7 is a flow chart that illustrates a second participant's exemplary role in the conversation described with reference to FIG. 5.

FIG. 7 is a flow chart that illustrates a method 700 performed by a second participant role in the conversation described with reference to FIG. 5. Continuing with the example above, the second participant is the hotel guest utilizing device 100 and an application 500 and corresponding cross-platform framework 220 (hotel guest). At block 705, the hotel guest creates 505 the same topic as the front desk so that they may participate in the same conversation. At block 710, the hotel guest extends the message class 510. At block 715, the hotel guest implements a chatter listener. At block 720, the hotel guest calls the chatter method 515 to start a communication layer that is capable of sending and receiving messages. At block 725, the hotel guest joins 520 the wake up call conversation. At block 730, the hotel guest waits until it receives an alarm message from the front desk, e.g., by continually determining if a message with the corresponding message identifier has been received. At block 735, the alarm message 735 is received and unpacked 530. At block 740, the wake up call is executed by activating/buzzing the hotel guest's alarm 530.

The programs may be implemented in a high level procedural or object oriented programming language to communicate with a processing system. The programs may also be implemented in assembly or machine language, if desired. In fact, the mechanisms described herein are not limited in scope to any particular programming language. In any case, the language may be a compiled or interpreted language.

Embodiments of the mechanisms disclosed herein may be implemented in hardware, software, firmware, or a combination of such implementation approaches. Embodiments of the invention may be implemented as computer programs executing on programmable systems comprising at least one processor, a data storage system (including volatile and non-volatile memory and/or storage elements), at least one input device, and at least one output device. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The above description is intended to illustrate preferred embodiments of the present invention. From the discussion above it should also be apparent that especially in such an area of technology, where growth is fast and further advancements are not easily foreseen, the invention may be modified in arrangement and detail by those skilled in the art without departing from the principles of the present invention within the scope of the accompanying claims and their equivalents. For example, while the above description has primarily focused on running in a software environment, in some embodiments one or more of these components is a dedicated hardware device.

We claim:

1. A computer-implemented method comprising:

executing, by a device, a cross-platform application programming interface (API), wherein the cross-platform API includes functionality to support a plurality of applications, wherein execution of one of the plurality of the applications includes interaction between a plurality of entities within a local network, and wherein the cross-platform API implements a request from the application for the device to participate in a unique conversation, wherein the unique conversation is identified by a topic and independent of a unique identifier for entities, the cross-platform API provides the application an abstracted discovery mechanism by which the application causes the device to discover an entity that is accessible on the local network participating in the unique conversation, wherein the abstracted discovery mechanism performs said discovery by sending messages according to a plurality of underlying discovery protocols and monitoring for a message utilizing one of the plurality of underlying discover protocols from the entity, the sending and monitoring of messages including:

sending a first message according to a first of the plurality of underlying discovery protocols, monitoring for a second message utilizing the first discovery protocol from the entity, determining that the second message has not been received, sending, in response to determining that the second message has not been received, a third message according to a second of the plurality of underlying discovery protocols, and receiving a fourth message utilizing the second discovery protocol from the entity, and the cross-platform API provides the application with a message passing mechanism by which the application causes the device to exchange messages related to the unique conversation with the entity.

2. The computer-implemented method of claim 1, wherein message passing mechanism populates values in a static byte array to be sent as an Internet Protocol (IP) packet.

3. The computer-implemented method of claim 1, wherein the cross-platform API supports both peer-to-peer and client-server communication relationships between the device and the entity.

4. The computer-implemented method of claim 1, wherein the plurality of applications supported by the cross-platform API include a variety of types of applications.

5. The computer-implemented method of claim 4, wherein the variety of types of applications include multi-player games, remote control applications, content sharing applications, polling applications, and printing applications.

6. The computer-implemented method of claim 1, wherein the abstracted discovery mechanism includes asynchronously probing the local network to find entities participating in the unique conversation, receiving an acknowledgement message from each participating entity, each acknowledgement message including an address and port number, and updating a list of entities participating in the unique conversation.

7. The computer-implemented method of claim 6, wherein the address is a link-local address and the cross-platform API operates based upon the assumption that the link-local address is unique.

8. The computer-implemented method of claim 1, wherein the entity participates in the unique conversation as a proxy for one or more services to which the entity has access.

9. A non-transitory machine-readable storage medium storing instructions that, when executed, cause a device to perform a method comprising:

executing a cross-platform application programming interface (API), wherein the cross-platform API includes functionality to support a plurality of applications, wherein execution of one of the plurality of the applications includes interaction between a plurality of entities within a local network, and wherein the cross-platform API implements a request from the application for the device to participate in a unique conversation, wherein the unique conversation is identified by a topic and independent of a unique identifier for entities, the cross-platform API provides the application an abstracted discovery mechanism by which the application causes the device to discover an entity that is accessible on the local network participating in the unique conversation, wherein the abstracted discovery mechanism performs said discovery by:

sending a first message according to a first of the plurality of underlying discovery protocols, monitoring for a second message utilizing the first discovery protocol from the entity, determining that the second message has not been received, sending, in response to determining that the second message has not been received, a third message according to a second of the plurality of underlying discovery protocols, and receiving a fourth message utilizing the second discovery protocol from the entity, and the cross-platform API provides the application with a message passing mechanism by which the application causes the device to exchange messages related to the unique conversation with the entity.

10. The machine-readable storage medium of claim 9, wherein message passing mechanism populates values in a static byte array to be sent as an Internet Protocol (IP) packet.

11. The machine-readable storage medium of claim 9, wherein the cross-platform API supports both peer-to-peer and client-server communication relationships between the device and the entity.

12. The machine-readable storage medium of claim 9, wherein the plurality of applications supported by the cross-platform API include a variety of types of applications.

13. The machine-readable storage medium of claim 12, wherein the variety of types of applications include multi-player games, remote control applications, content sharing applications, polling applications, and printing applications.

14. The machine-readable storage medium of claim 9, wherein the abstracted discovery mechanism includes asynchronously probing the local network to find entities participating in the unique conversation, receiving an acknowledgement message from each participating entity, each acknowledgement message including an address and port number, and updating a list of entities participating in the unique conversation.

15. The machine-readable storage medium of claim 9, wherein the address is a link-local address and the cross-platform API operates based upon the assumption that the link-local address is unique.

16. The machine-readable storage medium of claim 9, wherein the entity participates in the unique conversation as a proxy for one or more services to which the entity has access.

17. An apparatus comprising:

a processing device, wherein the processing device executes instructions that cause the apparatus to execute a cross-platform application programming interface (API), wherein the cross-platform API includes functionality to support a plurality of applications, wherein execution of one of the plurality of the applications includes interaction between a plurality of entities within a local network, and wherein the cross-platform API implements a request from the application for the apparatus to participate in a unique conversation, wherein the unique conversation is identified by a topic and independent of a unique identifier for entities, the cross-platform API provides the application an abstracted discovery mechanism by which the application causes the device to discover an entity that is accessible on the local network participating in the unique conversation, wherein the abstracted discovery mechanism performs said discovery by:

sending a first message according to a first of the plurality of underlying discovery protocols, monitoring for a second message utilizing the first discovery protocol from the entity, determining that the second message has not been received, sending, in response to determining that the second message has not been received, a third message according to a second of the plurality of underlying discovery protocols, and receiving a fourth message utilizing the second discovery protocol from the entity, and the cross-platform API provides the application with a message passing mechanism by which the application causes the apparatus to exchange messages related to the unique conversation with the entity.

\* \* \* \* \*